M. G. HUBBARD.
Mowing Machine.
No. 17,277.
Patented May 12, 1857.
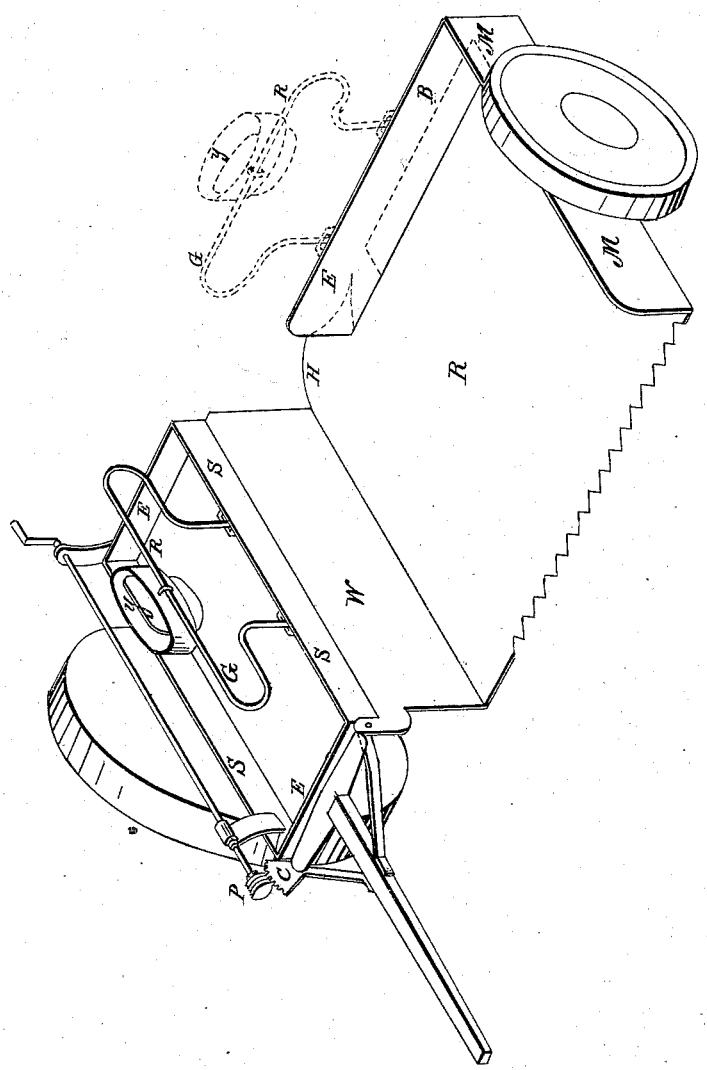
M. G. Hubbard.

UNITED STATES PATENT OFFICE.

M. G. HUBBARD, OF PENN YAN, NEW YORK.

IMPROVEMENT IN HARVESTERS.

Specification forming part of Letters Patent No. 17,277, dated May 12, 1857.

*To all whom it may concern:*

Be it known that I, MOSES G. HUBBARD, of Penn Yan, in the county of Yates and State of New York, have invented certain new and useful Improvements in Harvesters; and I do hereby declare the following to be a full and clear description of my improvement, reference being had to the accompanying drawing, illustrative thereof, which represents an isometrical view of the machine.

My improvement consists in a peculiar device for raising and lowering the frame of harvesters.

In arranging harvesters heretofore there has not been sufficient provision made for the varied circumstances under which they must work, and especially the proper accommodations for the raker have been overlooked. The manner in which the grain falls upon the platform depends upon a variety of circumstances, such as the surface of the land, and the direction of the wind, and the condition of the grain, &c.; and in order to enable the raker to do his work perfectly and easily it is necessary to make such arrangements for his accommodation as will permit him to conform in location and attitude to the constantly-varying circumstances under which he must work. I therefore dispense with the raker's seat or stand, usually provided for the raker to occupy, and substitute therefor the long guard-rail G R, and so arrange the machine that the raker may occupy such position along this guard-rail as the particular circumstances under which he may be working shall require. To accomplish these purposes it became necessary to make an entire change in the general arrangement of the machine, and to dispense with the usual controlling-lever used for controlling the position of the cutters and substituting therefor a new device that would not interfere with the arrangements herein described for accommodating the raker, and as such substitute I use a cogged segment, C, which is attached to the end of the pole-rocker, and into this cogged segment is fitted the worm P, from which a shaft extends back to the rear end of the machine, where a crank is attached, by means of which it is operated. I surround the elevated portion of the frame by side and end boards, S S and E E, so as to form a large inclosure in which to carry any loose parts of the machine, and for general convenience, but more especially for the security of the raker and driver in preventing any accidents by slipping off from the machine and becoming entangled in the machinery or moving parts.

In the drawings hereto attached, R is the platform on which the cut grain falls, and M, B, and W are wings entirely inclosing it, except the chute H, from which the grain is discharged at a sufficient distance from the standing grain to permit the machine to pass between them on the next swath. The raker stands within the inclosure S S E E and leans against the guard-rail G R, so that he can draw the grain over toward him and press it against the wing W, and then discharge it with his rake or fork through the chute H, and deliver it on the ground in a compact and even gavel, and also, by the range of movement permitted by the guard-rail, he can so control or aid the falling of tangled grain as to bring it with the next movement of his rake against the wing W in a more even and compact form.

The above-described arrangement of the wings and chute also facilitates the harvesting of grain in cases where it is too short to bind up into bundles, (which often occurs,) and in such cases the grain-heads may be drawn back against the wing B until a sufficient quantity is accumulated, and then discharged through chute H, and when it requires to be left in rows on the ground, for convenience in loading up, it is advantageous to place the raker on the rear of the platform, so that he can see the rows and deposit the grain accordingly. In this case, and whenever convenience requires, I move the guard-rail to the rear of the grain-platform, and back of which is secured a narrow foot-platform for the raker, so that he can step to one side of the machine or the other, as may be convenient, in arranging and depositing the grain, &c.

When the ground is uneven the raker places a safety-band, Y, around his body and secures it to the guard-rail G R by a ring, which will slide on the rail, and thus hold him safely on the machine without interfering with or contracting the range of movement which the guard-rail is intended to attain.

It will be seen that the device for raising and lowering the frame is peculiarly adapted to such purposes inasmuch as when the cutters have been raised to any desired position they will be rigidly retained in such position without the aid of catches or other like devices.

Having thus fully described my improvement, what I claim as new, and desire to secure by Letters Patent, is—

The employment of the cogged segment C, attached to the pole-rocker, in combination with the worm P, for the purpose of elevating and depressing the frame, as above set forth.

M. G. HUBBARD.

Witnesses:
HEZEKIAH BRADFORD,
W. H. STANSBURY.